United States Patent
Yogo et al.

(10) Patent No.: US 11,218,041 B2
(45) Date of Patent: Jan. 4, 2022

(54) MOTOR ROTOR, MOTOR USING SAME, AND ELECTRIC COMPRESSOR

(71) Applicant: MITSUBISHI HEAVY INDUSTRIES THERMAL SYSTEMS, LTD., Tokyo (JP)

(72) Inventors: Ichiro Yogo, Aichi (JP); Kazuhide Watanabe, Aichi (JP); Akinori Yoshioka, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 179 days.

(21) Appl. No.: 15/523,748

(22) PCT Filed: Oct. 27, 2015

(86) PCT No.: PCT/JP2015/080165
§ 371 (c)(1),
(2) Date: May 2, 2017

(87) PCT Pub. No.: WO2016/076103
PCT Pub. Date: May 19, 2016

(65) Prior Publication Data
US 2017/0324289 A1 Nov. 9, 2017

(30) Foreign Application Priority Data

Nov. 13, 2014 (JP) .............................. JP2014-230858

(51) Int. Cl.
*H02K 1/28* (2006.01)
*H02K 15/02* (2006.01)
*H02K 7/04* (2006.01)
*H02K 7/14* (2006.01)

(52) U.S. Cl.
CPC ................. *H02K 1/28* (2013.01); *H02K 7/04* (2013.01); *H02K 7/14* (2013.01); *H02K 15/02* (2013.01)

(58) Field of Classification Search
CPC ........ H02K 15/16; H02K 15/165; H02K 7/04; F16B 5/04
(Continued)

(56) References Cited

U.S. PATENT DOCUMENTS

| 4,742,259 | A   |   | 5/1988 | Schaefer et al.         |
|-----------|-----|---|--------|-------------------------|
| 4,938,644 | A   | * | 7/1990 | Runels ........ F16B 39/10 |
|           |     |   |        | 411/132                 |
| 9,746,021 | B2  | * | 8/2017 | Kawashima ...... F16B 43/001 |

(Continued)

FOREIGN PATENT DOCUMENTS

| JP | 63-290149 A  | 11/1988 |
|----|--------------|---------|
| JP | 2-46142 A    | 2/1990  |
| JP | 2000-116080 A | 4/2000 |

(Continued)

OTHER PUBLICATIONS

Office Action dated Jun. 2, 2020 for Japanese Patent Application No. 2014-230858 with an English Translation.

*Primary Examiner* — Quyen P Leung
*Assistant Examiner* — Minki Chang
(74) *Attorney, Agent, or Firm* — Birch, Stewart, Kolasch & Birch, LLP (57) ABSTRACT

A motor rotor equipped with a cylindrical rotor core formed by stacking multiple electromagnetic steel plates, end plates and balance weights stacked at both ends of the rotor core, and multiple headed swaging pins penetrating and integrally connecting the rotor core, the end plates, and the balance weights, wherein spacers or washers formed of a harder material than the swaging pins are interposed between the seating surface of the balance weights and the heads of the swaging pins. Thus, resistance of the motor rotor to exces- (Continued)

sive excitation force can be increased and a decrease in fastening strength can easily be prevented without changing the structure integrally fastened together by the swaging pins.

8 Claims, 3 Drawing Sheets

(58) Field of Classification Search
USPC .............................................. 310/81, 216.117
See application file for complete search history.

(56) References Cited

U.S. PATENT DOCUMENTS

| | | | | |
|---|---|---|---|---|
| 2001/0022926 | A1* | 9/2001 | Kitayama | F16B 43/001 411/531 |
| 2003/0230948 | A1* | 12/2003 | Murakami | H02K 1/276 310/156.53 |
| 2012/0098359 | A1* | 4/2012 | Morozumi | H02K 7/04 310/51 |
| 2012/0260490 | A1* | 10/2012 | Sakoda | F16B 19/1045 29/525.06 |
| 2014/0265717 | A1* | 9/2014 | Boxberg | H02K 17/16 310/216.117 |
| 2016/0001789 | A1 | 1/2016 | Kato et al. | |

FOREIGN PATENT DOCUMENTS

| | | |
|---|---|---|
| JP | 2007-198335 A | 8/2007 |
| JP | 2009-124821 A | 6/2009 |
| JP | 2012-253884 A | 12/2012 |
| JP | 2014-162336 A | 9/2014 |

* cited by examiner

FIG. 4

MOTOR ROTOR, MOTOR USING SAME, AND ELECTRIC COMPRESSOR

TECHNICAL FIELD

The present invention relates to a motor rotor which cylindrically stacks a plurality of electromagnetic steel plates and integrally fastens the plurality of electromagnetic steel plates by swaging pins, and a motor and an electric compressor using the same.

BACKGROUND ART

In a rotor of a motor used in an electric compressor, a plurality of electromagnetic steel plates are cylindrically stacked so as to configure a rotor core, a magnet is embedded to the inside of the rotor core, end plates are stacked on both ends of the rotor core, balance weights are stacked on both end surfaces, and the rotor core, the end plates, and the balance weights are integrally fastened by a plurality of headed swaging pins (also referred to as rivets) or bolts and nuts which are inserted from one side (for example, refer to PTLs 1 to 3).

In this motor rotor, in general, a ferrous base material is used as the material of the swaging pin, a brass material, a zinc material, a stainless material, or the like is used as the material of the end plats in order to prevent a leakage of magnetic flux, and a brass material, a steel material, a stainless material, or the like which is a metal having a high specific weight is used as the material of the balance weight. In addition, in order to integrally fasten the plurality of electromagnetic steel plates including balance weights and the end plates, bolts and nuts described in PTL 3 are used. However, economically, as shown in PTLs 1 and 2, the end plates and/or balance weights are integrally fastened simultaneously by the swaging pins.

CITATION LIST

Patent Literature

[PTL 1] Japanese Unexamined Patent Application Publication No. 2009-124821
[PTL 2] Japanese Unexamined Patent Application Publication No. 2000-116080
[PTL 3] Japanese Unexamined Patent Application Publication No. 2007-198335

SUMMARY OF INVENTION

Technical Problem

In the motor rotor having the above-described configuration, in most cases, the ferrous base material is mainly used as the material of the swaging pin, and a brass material is used as the materials of the balance weight and the end plate for the sake of the functions. However, the present inventors assumed an overload operation under an excitation condition in which an excessive load was applied to the motor rotor and performed an excitation test (excitation test in X, Y, and Z axial directions). As a result, the seating surface of the balance weight which was stacked and disposed on the head side of the swaging pin was depressed by setting due to the contact with the swaging pin head, rattling occurred due to a decrease in fastening strength, and there was a concern that damages occurred.

The above-described problems are likely to be more and more conspicuous as a load applied to a motor increase and the motor rotates a high speed, and measures are necessary in a motor to which the motor rotor having the above-described configuration is applied and an electric compressor or the like to which the motor is applied.

The present invention is made in consideration of the above-described circumstance, and an object thereof is to provide a motor rotor in which a resistance with respect to an excessive excitation force of the motor rotor can be increased without changing an integral fastening structure formed by the swaging pin and a decrease in fastening strength can be easily prevented, and a motor and an electric compressor using the motor rotor.

Solution to Problem

In order to achieve the above-described object, a motor rotor of the present invention and a motor and an electric compressor using the motor rotor adopt the following means.

That is, according to an aspect of the present invention, there is provided a motor rotor, including: a cylindrical rotor core which is formed by stacking a plurality of electromagnetic steel plates; end plates and balance weights which are stacked on both ends of the rotor core; and a plurality of headed swaging pins which penetrate and integrally fasten the rotor core, the end plates, and the balance weights, in which a washer or a spacer which is formed of a harder material than materials of the swaging pins is interposed between a head of each swaging pin and a seating surface of each balance weight.

According to the present invention, in the motor rotor in which the end plates and the balance weights are stacked on both ends of the rotor core which is formed by stacking the plurality of electromagnetic steel plates and the rotor core, the end plates, and the balance weights are integrally fastened so as to be swaged by the plurality of headed swaging pins, the washer or the spacer which is formed of a harder material than the material of the swaging pin is interposed between the head of the swaging pin and the seating surface of the balance weight. Accordingly, even under an excitation condition in which an excessive load is applied to the motor rotor, since the seating surface of the balance weight which is stacked and disposed on the head side of the swaging pin is in contact with the swaging pin head via the washer or the spacer formed of a harder material than that of the swaging pin, depression in the seating surface due to contact with the swaging pin head is not generated, it is possible to maintain fastening strength.

Meanwhile, a swaging piece of the swaging pin can be rigidly swaged so as to be bitten to the end plate or the balance weight which is stacked and disposed on the swaging portion side of the swaging pin. Accordingly, since the fastening strength of the balance weight performed by the swaging pin increases and resistance with respect to an excessive excitation force is improved, it is possible to decrease risk of the fastening strength of the balance weight decreasing, rattling occurring, and damage occurring, and it is possible to enhance quality of the motor so as to secure reliability of the motor.

In addition, in the motor rotor of the present invention, in the above-described motor rotor, a counterbore which causes the washer or the spacer to be interposed is provided on the seating surface of the balance weight.

According to the present invention, since a counterbore which causes the washer or the spacer to be interposed is provided on the seating surface of the balance weight, the washer or the spacer can be interposed between the swaging pin head and the seating surface of the balance weight via the counterbore. Accordingly, it is possible to stabilize seating of the washer or the spacer, and it is possible to further increase the fastening strength of the balance weight.

In addition, in the motor rotor of the present invention, in any one of the above-described motor rotors, a diameter of the washer or the spacer is larger than a diameter of a head of the swaging pin.

According to the present invention, since the diameter of the washer or the spacer is larger than the diameter of the head of the swaging pin, it is possible to reliably decrease a surface procedure applied to the seating surface of the balance weight by allowing the diameter of the washer or the spacer which is in contact with the seating surface of the balance weight to be larger than the diameter of the head of the swaging pin, and it is possible to prevent depression due to setting of the seating surface. Accordingly, it is possible to increase fastening strength of the balance weight and it is possible to reliably improve the resistance with respect to an excessive excitation force.

Moreover, in the motor rotor of the present invention, in any one of the above-described motor rotors, a swaging pin is formed of a ferrous base material, the balance weight is formed of a brass material, and the washer or the spacer is formed of a stainless material.

According to the present invention, since the swaging pin is formed of a ferrous base material, the balance weight is formed of a brass material, and the washer or the spacer is formed of a stainless material, the inexpensive washer or spacer is interposed in a state where a brass material which has lower hardness than that of the swaging pin and is cheaper than a stainless material or the like is used as the balance weight, and it is possible to secure the fastening strength of the balance weight. Accordingly, it is possible to increase the fastening strength of the balance weight while preventing an increase in cost, and it is possible to improve the resistance with respect to an excessive excitation force.

In addition, according to another aspect of the present invention, there is provided a motor, including: a motor rotor; and a motor stator, in which the motor rotor is any one of the above-described motor rotors.

According to the motor of the present invention, since the motor rotor is any one of the above-described motor rotors, it is possible to improve fastening strength of the end plates and the balance weights which are staked on both ends of the motor rotor and are integrally fastened via the swaging pins. Accordingly, since the resistance with respect to the excessive excitation force increases even under an excitation condition in which an excessive load is applied to the motor rotor, it is possible to decrease risk of the fastening strength of the end plate and the balance weight decreasing, rattling occurring, and damage occurring, and it is possible to enhance quality of the motor so as to secure reliability of the motor.

In addition, according to still another aspect of the present invention, there is provided an electric compressor, including: a compression mechanism; and a motor which drives the compression mechanism via a driving shaft, in which the motor is the above-described motor.

According to the electric compressor of the present invention, since the motor which drives the compression mechanism, via the driving shaft, is the above-described motor, the resistance with respect to the excessive excitation force increases even under an excitation condition in which an excessive load is applied to the rotor of the motor which drives the compression mechanism, and if is possible to decrease risk of the fastening strength of the end plate and the balance weight decreasing, rattling occurring, and damage occurring. Accordingly, it is possible to further improve a vibration-proof performance at the time of the overload operation of the electric compressor so as to increase reliability of the electric compressor.

Advantageous Effects of Invention

According to the motor rotor of the present invention, even under an excitation condition in which an excessive load is applied to the motor rotor, since the seating surface of the balance weight which is stacked and disposed on the head side of the swaging pin is in contact with the swaging pin head via the washer or the spacer formed of a harder material than that of the swaging pin, depression in the seating surface due to contact with the swaging pin head is not generated, it is possible to maintain fastening strength. Meanwhile, the swaging piece of the swaging pin can be rigidly swaged so as to be bitten to the end plate or the balance weight which is stacked and disposed on the swaging portion side of the swaging pin. Accordingly, since the fastening strength of the balance weight performed by the swaging pin increases and resistance with respect to an excessive excitation force is improved, it is possible to decrease risk of the fastening strength of the balance weight decreasing, rattling occurring, and damage occurring, and it is possible to enhance quality of the motor so as to secure reliability of the motor.

According to the motor of the present invention, it is possible to improve fastening strength of the end plates and the balance weights which are staked on both ends of the motor rotor and are integrally fastened via the swaging pins. Accordingly, since the resistance with respect to the excessive excitation force increases even under an excitation condition in which an excessive load is applied to the motor rotor, it is possible to decrease risk of the fastening strength of the end plate and the balance weight decreasing, rattling occurring, and damage occurring, and it is possible to enhance quality of the motor so as to secure reliability of the motor.

According to the electric compressor of the present invention, since the resistance with respect to the excessive excitation force increases even under an excitation condition in which an excessive load is applied to the rotor of the motor which drives the compression mechanism, and it is possible to decrease risk of the fastening strength of the end plate and the balance weight decreasing, rattling occurring, and damage occurring. Accordingly, it is possible to further improve a vibration-proof performance at the time of the overload operation of the electric compressor so as to increase reliability of the electric compressor.

DESCRIPTION OF EMBODIMENTS

Hereinafter, embodiments according to the present invention will be described with reference to the drawings.

First Embodiment

Hereinafter, a first embodiment of the present invention will be described with reference to FIGS. 1 to 3.

Figure 1:
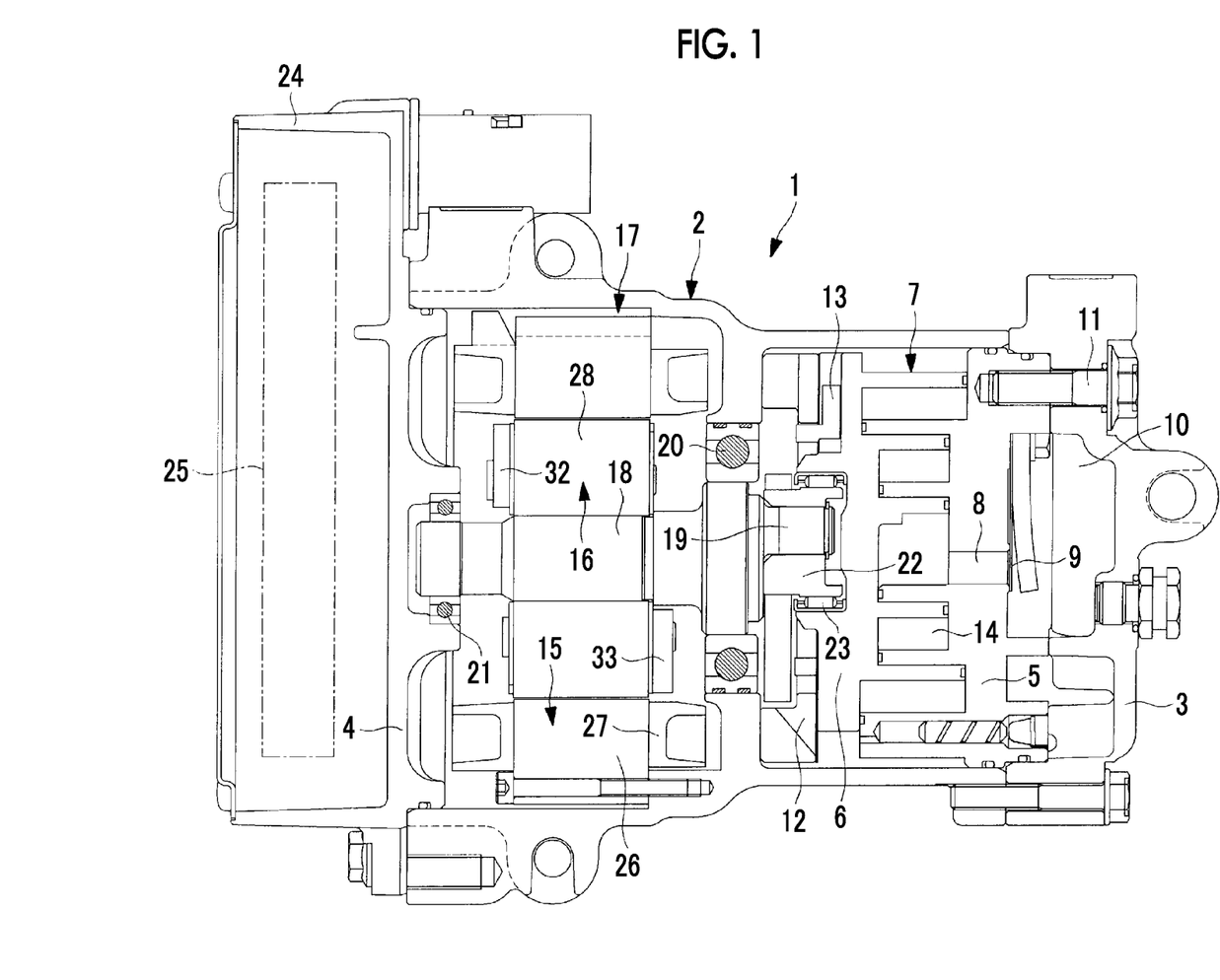
FIG. 1 is a longitudinal sectional view of an electric compressor according to a first embodiment of the present invention.

FIG. 1 is a longitudinal sectional view of an electric compressor according to a first embodiment of the present invention. FIG. 2 is a longitudinal sectional view of a motor rotor, and FIG. 3 is an enlarged sectional corresponding view of an A portion.

Here, the electric compressor 1 is an inverter integrated electric compressor 1 in which an inverter 25 driving a motor 1 is integrally incorporated to a housing 2 of the electric compressor 1. However, the present invention can be similarly applied to the electric compressor 1 in which the inverter 25 is not provided, or the inverter 25 is separately installed.

The inverter integrated electric compressor 1 includes a cylindrical housing 2, one end side of the housing 2 is sealed by a compressor-side end housing 3, and the other end side of the housing 2 is sealed by a motor-side end housing 4. A known scroll compression mechanism (compression mechanism) 7 configured of a pair of fixed scroll 5 and turning scroll 6 is incorporated into one end side of the cylindrical housing 2, and a high-pressure refrigerant gas which is compressed by the compression mechanism 7 is ejected into an ejection chamber 10 via an ejection port 8 and an ejection valve 9 and is ejected to a refrigerating cycle from the ejection chamber 10.

The fixed scroll 5 configuring the scroll compression mechanism 7 is fixed to the compressor-side end housing 3 by a bolt 11, and the turning scroll 6 is swingably supported by a thrust bearing 12 via rotation blocking means such as an Oldham link 13. The fixed scroll 5 and the turning scroll 6 engage with each other as well known so as to form a compression chamber 14, the compression chamber 14 is moved by revolution turning driving of the turning scroll 6 while the volume of the compression chamber 14 is decreased from the outer circumferential side to the center side so as to perform the compression operation.

A motor 17 configured of a motor stator (stator) 15 and a motor rotor (rotor) 16 is incorporated into the other end side of the cylindrical housing 2, and a driving shaft 18 is integrally connected to the motor rotor 16 of the motor 17. The driving shaft 18 is rotatably supported by a bearing 20 which is installed around the center inside the housing 2 and a bearing 21 which is provided in the inner surface of the motor-side end housing 4, a crank pin 19 provided on one end of the driving shaft 18 is connected to the turning scroll via a drive bush 22 and a turning bearing 23, and the turning scroll 6, that is, the scroll compression mechanism 7 can be driven.

Meanwhile, an inverter accommodation portion 24 is integrally formed on the outer surface side of the motor-side end housing 4, and the inverter 25 which drives the motor 17 is installed and accommodated inside the inverter accommodation portion 24. The inverter 25 converts DC power supplied from an external battery or the like into three-phase AC power having a desired frequency, the three-phase alternating power is applied to the motor 17 via a hermetic terminal (not shown) which penetrates the motor-side end housing 4, and the motor 17 is driven.

For example, the inverter 25 is configured of a power substrate on which a switching circuit having multiple power transistors such as IGBT which is a power semiconductor switching element is mounted, a control substrate on which a control communication circuit having an element which is operated at a low voltage such as a GPO which controls the switching circuit and others based on a control signal input from the outside is mounted, a smoothing capacitor which is configured of a filter circuit for removing noise, and an electric component such as a coil, and since the inverter 25 itself is well known, the detail descriptions are omitted.

As described above, the motor 17 which is driven via the inverter 25 is configured of the motor stator (stator) 15 and the motor rotor (rotor) 16. The motor stator (stator) 15 includes a stator core 26 which is configured by stacking a required number of electromagnetic steel plates which are annularly punched, and winding coils (not shown) are collectively wound around tooth portions provided on the inner circumferential side of the stator core 26 via an insulating bobbin 21.

Figure 2:
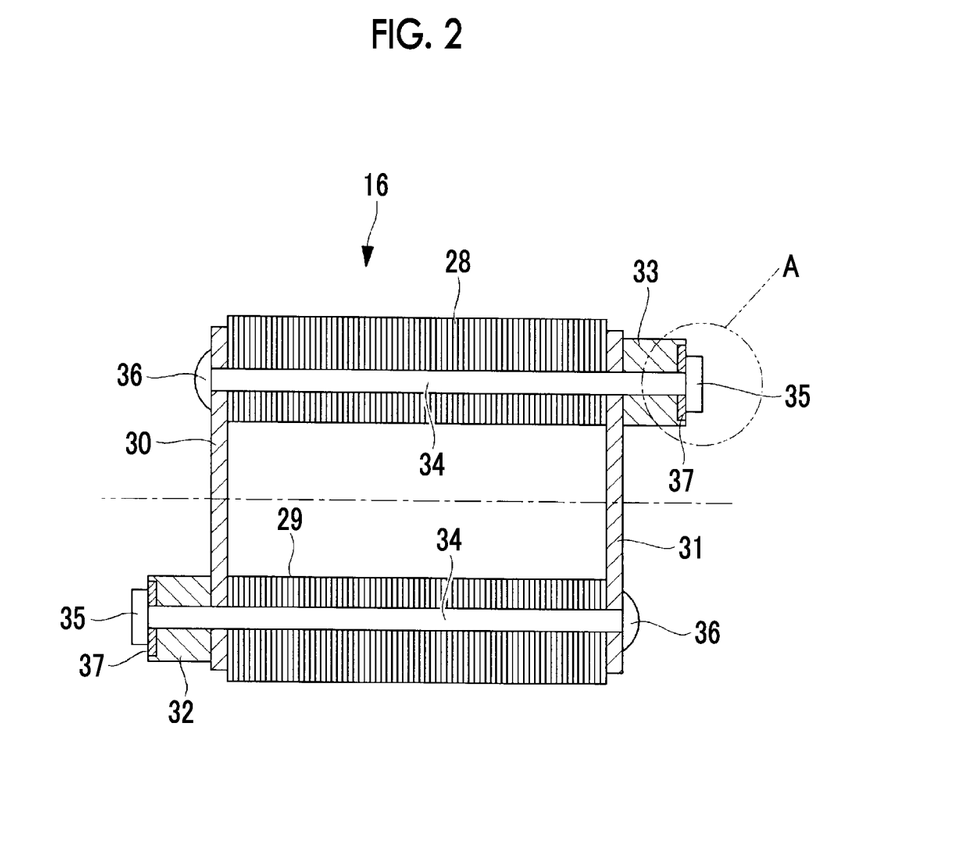
FIG. 2 is a longitudinal sectional view of a motor rotor in the electric compressor.
Figure 3:
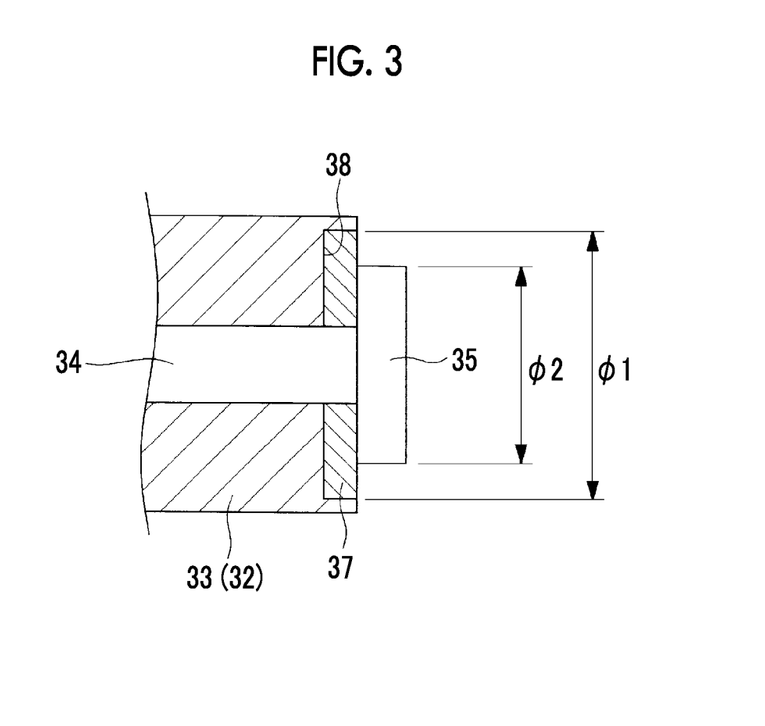
FIG. 3 is an enlarged sectional corresponding view of an A portion of the motor rotor.

Meanwhile, as shown in FIG. 2, the motor rotor (rotor) 16 which is rotatably provided on the inner circumference of the motor stator 15 via a predetermined motor gap includes a cylindrical rotor core 28 which is configured by laminating a required number of thin punched electromagnetic steel plates, and a through hole 29 which is fitted to the driving shaft 18 axially penetrates at the center portion of the rotor core 28. In the rotor core 28, magnetic embedded holes having the number corresponding to the number of motor poles are provided along the outer circumference portion of the rotor core 28 so as to surround the through hole 29, and a permanent magnet (not shown) (hereinafter, simply referred, to as a magnet) is incorporated into each magnet embedded hole.

In addition, end plates 30 and 31 are stacked on both end surfaces of the rotor core 28 formed by stacking a plurality of electromagnetic steel plates so as to prevent slipping out of the magnets and prevent a leakage of magnetic flux, and balance weights 32 and 33 for balancing a rotating system are stacked and disposed on the outer surfaces of the end plates 30 and 31. The rotor core 28, the end plates 30 and 31, the balance weights 32 and 33 are integrally fastened via a plurality of (four in the present embodiment) headed swaging pins (also referred to as rivets) 34.

A head 35 is provided on one end side of each of the headed swaging pins 34, and a swaging portion 36 is provided on the other end side thereof. The headed swaging pins 34 are inserted into through holes (not shown) provided in the rotor core 28, the end plates 30 and 31, and the balance weights 32 and 33 from the balance weights 32 and 33 sides, and the swaging portions 36 is swaged to the end plates 31 and 30 or the balance weights 33 and 32 of the other end sides by a swage tool. Accordingly, the rotor core 28, the end plates 30 and 31, and the balance weights 32 and 33 are rigidly and integrally fastened.

In addition, as described above, in the present embodiment, even in a case where the motor rotor (rotor) 16, in which the rotor core 28, the end plates 30 and 31, and the balance weights 32 and 33 are integrally fastened via the headed swaging pins 34, is repeatedly operated under an excitation condition in which an excessive load is applied to the motor rotor 16 due to an overload operation or the like, in order to prevent fastening strength of the balance weights 32 and 33 fastened toy the swaging pins 34 from decreasing and prevent occurrence of rattling and damages, the following configuration is adopted.

As a result of an excitation test, as described above, it is found out that the reason why the fastening strength with respect to the balance weights 32 and 33 decreases is because the seating surfaces of the balance weights 32 and 33 laminated and disposed on the head 35 side of the swaging pin 34 are depressed by setting due to contact with the head 35 of the swaging pin 34, the fastening strength decreases, and rattling occurs. It is considered that the above-described problems occur because a brass material which is a high specific weight metal is used as the materials of the balance weights 32 and 33 and the hardness of the brass material is lower than that of a ferrous base material which is mainly used as the material of the swaging pin.

Accordingly, in the present embodiment, for example, washers 37 are interposed between the heads 35 of the swaging pins 34 which integrally fastens the balance weights 32 and 33 to the rotor core 28 and the seating surfaces of the balance weights 32 and 33, and the washers 37 are formed of a material, for example, a stainless material which is harder than the materials of the swaging pins 34 which use a ferrous base material in most cases, and integrally fasten the balance weights 32 and 33. Accordingly, even when an excessive load is applied to the head 35 sides of the swaging pins 34, depression due to setting of the seating surfaces of the balance weights 32 and 33 does not occur.

That is, in general, for example, the swaging pin 34 is formed of a ferrous base material such as cold heading carbon steel (JIS-G-3507-2), the end plates 30 and 31 are formed of a non-magnetic material such as aluminum so as to prevent a leakage of a magnetic flux, and the balance weights 32 and 33 are formed of a brass material, a stainless material, or the like which has high specific weight. In the present embodiment, among the materials, each of the swaging pins 34 is formed of a ferrous base material, each of the washers 37 formed of a stainless material having higher hardness than that of the swaging pin 34 is interposed therebetween in a state where a brass material which is a metal having high specific weight and is cheaper than the stainless material or the like is used as the material of each of the balance weights 32 and 33 which are in contact with the heads 35 of the swaging pins 34, and the above-described condition is satisfied.

In addition, as described above, when the configuration is adopted, in which the washer 37 is interposed between the head 35 of the swaging pin 34 and the seating surface of each of the balance weights 32 and 33, a diameter $\phi 1$ of the washer 37 is larger than a diameter $\phi 2$ of the head of the swaging pin 34 ($\phi 1 > \phi 2$) and a counterbore 38 is provided on the seating surface of each of the balance weights 32 and 33 so as to stabilize seating of the washer 37. However, the counterbore 38 is not indispensable and may be omitted.

According to the above-described configuration, the present embodiment exerts the following effects.

In the electric compressor 1, DC power supplied from an external power source is converted into three-phase AC power having a desired frequency by an inverter 25, the three-phase AC power is applied to the motor 17, the motor 17 is rotationally driven, and the scroll compression mechanism 7 is driven. According to driving of the motor 17 and the scroll compression mechanism 7, a low-pressure refrigerant gas is sucked into the housing 2 from a refrigerating cycle side, and the low-pressure refrigerant gas flows to the scroll compression mechanism 7 side along the inner surface side of the housing 2 and is sucked into the scroll compression mechanism 7 so as to be compressed to a high-temperature and high-pressure gas. The high-pressure gas is ejected to the outside via the ejection chamber 10.

During this, power having a frequency suitable for the load is applied to the motor 17 via the inverter 25, and during a high load operation, an excessive load is applied to the motor rotor 16 and a large excitation force is applied to the motor rotor 16. Meanwhile, in the present embodiment, in the motor rotor 15 in which the rotor core 28 formed by stacking the plurality of electromagnetic steel plates, the end plates 30 and 31 and the balance weights 32 and 33 are integrally fastened by the plurality of headed swaging pins 34, the washers 37 formed of a harder material than the material of the swaging pins 34 are interposed between the heads 33 of the swaging pins 34 and the seating surfaces of the balance weights 32 and 33.

Accordingly, even under an excitation condition which an excessive load is applied to the motor rotor 16, since the seating surface of each of the balance weights 32 and 33 on the head 35 side of the swaging pin 34 is in contact with the swaging pin head 35 via the washer 37 formed of a harder material than that of the swaging pin 34, depression in the seating surface due to contact with the swaging pin head 35 is not generated, it is possible to maintain fastening strength. Meanwhile, since the swaging portion 36 side of the swaging pin 34 is rigidly swaged such that the swaging pieces are bitten to the end plates 30 and 31 or the balance weights 32 and 33, it is possible to improve fastening strength by the swaging pin 34.

Accordingly, since the fastening strength of the balance weights 32 and 33 performed by the swaging pin 34 increases and resistance with respect to an excessive excitation force is improved, it is possible to decrease risk of the fastening strength of the balance weight 32 and 33 decreasing, rattling occurring, and damage occurring, and it is possible to enhance quality of the motor 17 so as to secure reliability of the motor 17.

In addition, when the washer 37 is interposed between the seating surface of each of the balance weights 32 and 33 and the swaging pin bead 35, since the counterbore 38 is provided on the seating surface of each of the balance weights 32 and 33, the washer 37 can be interposed between the swaging pin head 35 and the seating surface of each of the balance weights 32 and 33 via the counterbore 38. Accordingly, it is possible to stabilize seating of the washer 37, and it is possible to further increase the fastening strength of the balance weights 32 and 33.

Moreover, since the diameter $\phi 1$ of the washer 37 is larger than the diameter $\phi 2$ of the head of the swaging pin 34, it is possible to reliably decrease a surface pressure applied to the seating surface of the balance weights 32 and 33 by allowing the diameter $\phi 1$ of the washer 37 which is in contact with the seating surface of each of the balance weights 32 and 33 to be larger than the diameter $\phi 2$ of the head of the swaging pin 34, and it is possible to prevent depression due to setting of the seating surface. Accordingly, it is possible to increase fastening strength of the balance weights 32 and 33 and it is possible to reliably improve the resistance with respect to an excessive excitation force.

In the present embodiment, since the swaging pin 34 is formed of a ferrous base material, the balance weights 32 and 33 are formed of a brass material, and the washer 37 is formed of a stainless material, the inexpensive washer 37 is interposed in a state where a brass material which has lower hardness than that of the swaging pin 34 and is cheaper than a stainless material or the like is used as the balance weights 32 and 33, and it is possible to secure the fastening strength of the balance weights 32 and 33. Accordingly, it is possible to increase the fastening strength of the balance weights 32 and 33 while preventing an increase in cost, and it is possible to improve the resistance with respect to an excessive excitation force.

In the motor 17 according to the present embodiment, since the motor rotor 16 thereof is the above-described motor rotor 16, it is possible to improve fastening strength of the balance weights 32 and 33 which are staked on both ends of the meter rotor 16 and are integrally fastened by the swaging pins 34. Accordingly, since the resistance with respect to the excessive excitation force increases even under an excitation condition in which an excessive load is applied to the motor rotor 16, it is possible to decrease risk of the fastening strength of the balance weights 32 and 33 decreasing, rattling occurring, and damage occurring, and it is possible to enhance quality of the motor 17 so as to secure reliability of the motor 17.

Similarly, in the electric compressor 1 according to the present embodiment, since the motor 17 which drives the compression mechanism 7 via the driving shaft 18 is the above-described motor 17, the resistance with respect to the excessive excitation force increases even under an excitation condition in which an excessive load is applied to the motor rotor 16 of the motor 17 which drives the compression mechanism 7, and it is possible to decrease risk of the fastening strength of the balance weights 32 and 33 decreasing, rattling occurring, and damage occurring. Accordingly, it is possible to further improve a vibration-proof performance at the time of the overload operation of the electric compressor 1 so as to increase reliability of the electric compressor 1.

Second Embodiment

Next, a second embodiment of the present invention will be described with reference to FIG. 4.

The present embodiment is different from the first embodiment in that a spacer 39 is interposed therebetween instead of the washer 37. Since other matters are similar to the first embodiment, descriptions thereof are omitted.

Figure 4:
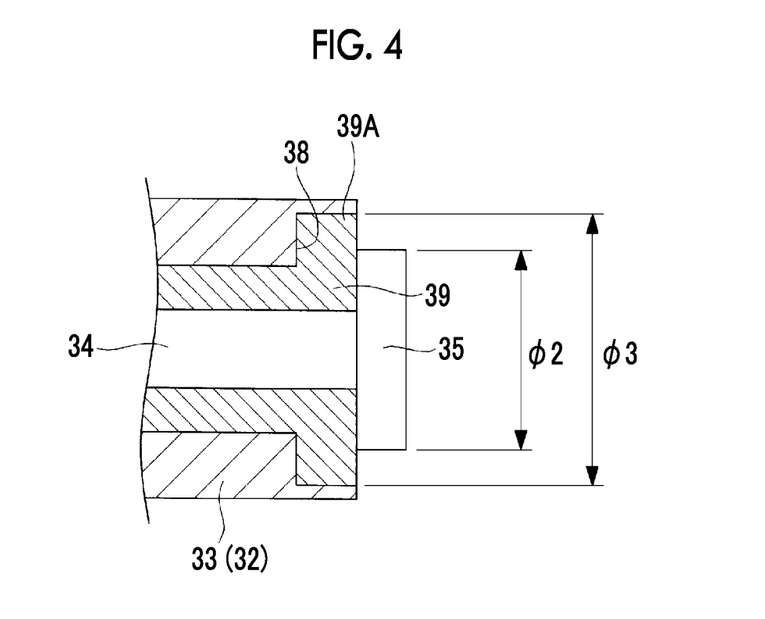
FIG. 4 is an enlarged sectional corresponding view of the A portion in FIG. 2 of a motor rotor according to a second embodiment of the present invention.

As shown in FIG. 4, in the present embodiment, the spacer 39 having a ring 39A is interposed between the head 35 of the swaging pin 34 and the seating surface of each of the balance weights 32 and 33, and the spacer 39 is formed of a material, for example, a stainless material which is harder than the swaging pin 34 formed of a ferrous base material and integrally fastens the balance weights 32 and 33. Accordingly, even when an excessive load is applied to the head 35 side of the swaging pin 34, depression duet to setting of the seating surface of each of the balance weights 32 and 33 does not occur.

In addition, similarly to the first embodiment, when the spacer 39 is interposed between the head 35 of the swaging pin 34 and the seating surface of each of the balance weights 32 and 33, the counterbore 38 is provided on the seating surface of each of the balance weights 32 and 33 and a diameter $\phi 3$ of the ring 39A of the spacer 39 is larger than the diameter of the swaging pin head 35 ($\phi 3 > \phi 2$).

According to this configuration, it is possible to obtain effects similar to those of the first embodiment.

In addition, the present invention is not limited to the above-described embodiments, and can be appropriately modified. For example, in the above-described embodiments, specific materials of the swaging pin 34 and the balance weights 32 and 33 are exemplified. However, the present invention is not limited to the materials, and materials other than the exemplified materials may be used as long as they satisfy a condition with respect to hardness specified by claim 1.

In addition, the shape, the size, or the like of each of the balance weights 32 and 33 is not particularly limited as long as it satisfies each function, and whether the sides to which the swaging portion 36 side of the swaging pin 34 is to be swaged are the balance weights 32 and 33 or the end plates 30 and 31 is determined according to the shape or the size. In addition, the compression mechanism is not limited to the scroll compression mechanism 7 and may be any compression mechanism.

REFERENCE SIGNS LIST

1: electric compressor
7: scroll compression mechanism (compression mechanism)
15: motor stator (stator)
16: motor rotor (rotor)
17: motor
18: driving shaft
28: rotor core
30, 31: end plate
32, 33: balance weight
34: swaging pin (rivet)
35: head
36: swaging portion
37: washer
38: counterbore
39: spacer
39A: ring
$\phi 1$: diameter of washer
$\phi 2$: diameter of swaging pin bead
$\phi 3$: diameter of ring of spacer

The invention claimed is:
1. A motor rotor, comprising:
a cylindrical rotor core which is formed by stacking a plurality of electromagnetic steel plates;
end plates and balance weights which are stacked on both ends of the rotor core; and
a plurality of headed swaging pins which penetrate and integrally fasten the rotor core, the end plates, and the balance weights, a head being provided on one end side of each headed swaging pin and a swaging portion being provided on the other end side thereof, and
a spacer formed of a harder material than materials of the headed swaging pins and having a spacer main body and a ring formed integrally with the spacer main body,
wherein a counterbore is provided on a seating surface of the balance weight,
wherein the ring of the spacer is interposed between a head of each headed swaging pin and the counterbore of each balance weight by inserting the ring of the spacer to the counterbore,
wherein the spacer main body is inserted into a through hole provided in the balance weight, and interposed between an inner wall of the through hole and the headed swaging pin,
wherein the spacer main body and the balance weight are in direct contact with each other,
wherein the ring is not interposed between a swaging portion of the headed swaging pin and the end plate or the balance weight, and
wherein the headed swaging pin is formed of a ferrous base material, the balance weight is formed of a brass material, and the spacer is formed of a stainless mate- rial such that a swaging piece of the swaging portion can be bitten to the end plate or the balance weight and that fastening strength of the balance weight and the end plate is maintained during a high-pressure refrigerant gas is ejected by driving the motor and the compression mechanism.

2. The motor rotor according to claim 1,
wherein a diameter of the spacer is larger than a diameter of a head of the headed swaging pin.

3. A motor, comprising:
a motor rotor; and
a motor stator,
wherein the motor rotor is the motor rotor according to claim 1.

4. An electric compressor, comprising:
a compression mechanism; and
a motor which drives the compression mechanism via a driving shaft,
wherein the motor is the motor according to claim 3.

5. The motor rotor according to claim 1,
wherein a diameter of the spacer is larger than a diameter of a head of the headed swaging pin.

6. A motor, comprising:
a motor rotor; and
a motor stator,
wherein the motor rotor is the motor rotor according to claim 1.

7. A motor rotor, comprising:
a cylindrical rotor core which is formed by stacking a plurality of electromagnetic steel plates;
end plates and balance weights which are stacked on both ends of the rotor core; and
a plurality of headed swaging pins which penetrate and integrally fasten the rotor core, the end plates, and the balance weights, a head being provided on one end side of each headed swaging pin and a swaging portion being provided on the other end side thereof, and
a washer formed of a harder material than materials of the headed swaging pins,
wherein a counterbore is provided on a seating surface of the balance weight,
wherein the washer is interposed between a head of each headed swaging pin and the seating surface of the balance weight,
wherein the washer and the seating surface of the counterbore are in direct contact with each other,
wherein the swaging portion has a surface that makes a direct contact with an end plate,
wherein a surface of the washer that makes direct contact with the seating surface overlaps with a surface of the swaging portion that makes contact with the end plate when viewed in an axial direction of the motor rotor, and wherein the headed swaging pin is formed of a ferrous base material, the balance weight is formed of a brass material, and the washer is formed of a stainless material such that a swaging piece of the swaging portion can be bitten to the end plate or the balance weight.

8. A motor rotor, comprising:
a cylindrical rotor core which is formed by stacking a plurality of electromagnetic steel plates;
end plates and balance weights which are stacked on both ends of the rotor core; and
a plurality of headed swaging pins which penetrate and integrally fasten the rotor core, the end plates, and the balance weights, a head being provided on one end side of each headed swaging pin and a swaging portion being provided on the other end side thereof, and
a spacer formed of a harder material than materials of the headed swaging pins and having a spacer main body and a ring formed integrally with the spacer main body,
wherein a counterbore is provided on a seating surface of the balance weight,
wherein the ring of the spacer is interposed between a head of each headed swaging pin and the counterbore of each balance weight by inserting the ring of the spacer to the counterbore,
wherein the spacer main body is inserted into a through hole provided in the balance weight, and interposed between an inner wall of the through hole and the headed swaging pin,
wherein the spacer main body and the balance weight are in direct contact with each other,
wherein the ring is not interposed between a swaging portion of the headed swaging pin and the end plate or the balance weight,
wherein the ring of the spacer has a surface that makes a direct contact with the seating surface of the counterbore,
wherein the swaging portion has a surface that makes a direct contact with an end plate,
wherein the surface of the ring of the spacer that makes the direct contact with seating surface overlaps the surface of the swaging portion that make the direct contact with the end plate, and
wherein the headed swaging pin is formed of a ferrous base material, the balance weight is formed of a brass material, and the spacer is formed of a stainless material such that a swaging piece of the swaging portion can be bitten to the end plate or the balance weight.

* * * * *